March 22, 1927.
R. CHILTON
1,621,494
CONNECTING ROD FOR ENGINES
Filed Jan. 12, 1926
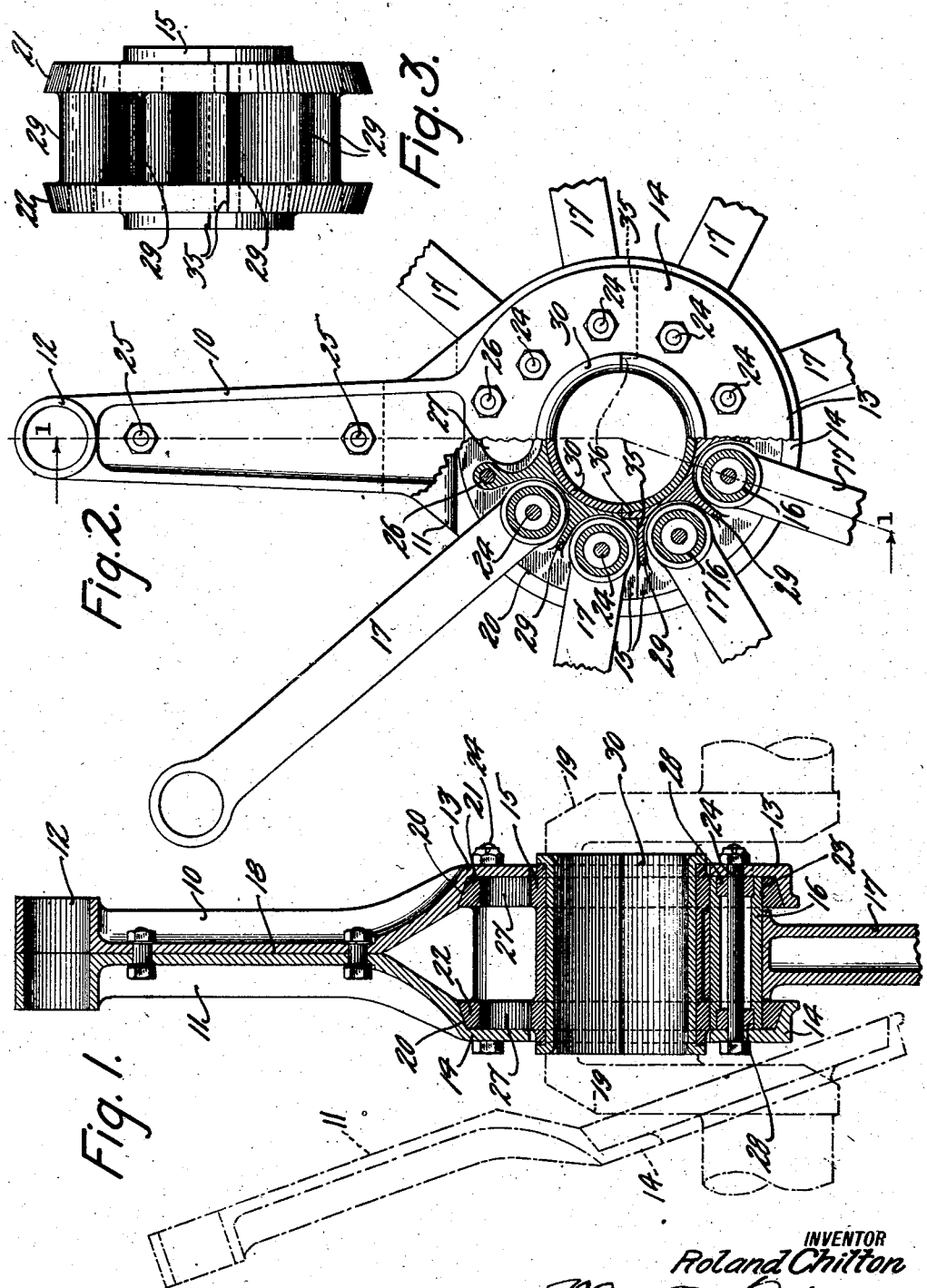
INVENTOR
Roland Chilton
BY
ATTORNEY Patented Mar. 22, 1927.

1,621,494

UNITED STATES PATENT OFFICE.

ROLAND CHILTON, OF KEYPORT, NEW JERSEY, ASSIGNOR TO HEALEY-AEROMARINE BUS COMPANY, INC., A CORPORATION OF NEW YORK.

CONNECTING ROD FOR ENGINES.

Application filed January 12, 1926. Serial No. 80,756.

This invention relates to the type of connecting rod assemblage wherein several subsidiary rods are articulated to a master rod as for use in an engine having radially disposed cylinders.

In the prior art such rods usually comprised a forged steel master rod having means around its crank pin end for carrying hinge pins for the subsidiary rods. Such rods are usually transversely split at the crank pin end for assembling purposes, and the resulting detachable cap is commonly secured to the main part of the rod by bolts. To avoid interference between the hinge pins of the auxiliary rods and the cap bolts the crank pin end of the conventional rod is apt to be relatively bulky; of irregular form and commonly has a great change in general section where the shank joins the bearing end.

Objects of the present invention are to overcome the foregoing defects and to provide a rod wherein the structural part at the bearing end is of a continuous and uniform section not weakened by the usual split construction or complicated as to form by the usual bolt bosses. Another object of the invention is to provide means whereby such an unsplit rod can be conveniently assembled over the throws of the crankshaft. A further object of the invention is to reinforce the rod bearing, especially around the holes for the hinge pins of the subsidiary rods and so permit of the use of a relatively light structure for the bearing parts.

A feature of this invention resides in the structure which embraces the crank pin bearing having a uniformly great depth of section continuing all around the bearing and not weakened by the usual large holes provided for the accommodation of the hinge pins of the auxiliary rods, as is common practice. By the present construction extreme rigidity of the whole structure against distortion of the bearing under the large local loads imposed by the auxiliary rods is achieved and destructive deflections of the crank pin bushing are avoided.

Various other objects and advantages of the invention will be in part obvious from an inspection of the accompanying drawings and a careful consideration of the following particular description and claims of one form of mechanism embodying my invention.

In the drawings:—

Figure 1 is a sectional view of the present invention taken on the line 1—1 of Figure 2 looking in the direction indicated by the arrows.

Figure 2 is a side elevation having portions broken away to reveal the interior.

Figure 3 is a detail view of the bearing member.

In the specific showing of the drawings a connecting rod suitable for a nine cylinder radial engine, such as used in aircraft is illustrated. The master rod itself consists of a two part shank, 10 and 11, having a wrist pin boss 12 at its upper end and enlarged at its lower end to form a pair of spaced apart rings 13, 14 of deep section adapted to embrace a split crank pin bearing 15, which is, in turn, provided with a plurality of hinge pins 16 for the auxiliary rods 17. For convenience in assembling, this master rod is preferably split on its longitudinal axis 18, transversely of the crank pin axis so as to comprise when disassembled two similar sides each having as aforesaid, an integral ring shaped end which can be threaded over the crank throws 19, (as shown by broken lines in Fig. 1), in order to bring it into position over the crank pin bearing member halves which it reinforces and secures together. To this end the embracing portions of the rod end rings 13, 14 are tapered as at 20 and engage a corresponding taper on the circular flanges 21, 22 which project from the bearing halves and are bored as at 23 for the hinge pins, 16. The halves of the rod are preferably secured together as to their ring portions by bolts 24 extending thru the hinge pins, said bolts drawing the tapered parts tightly together and also preventing end motion of the pins.

It is to be specially noted that the only holes on the ring portions 13, 14 are those for these relatively small bolts 24, which occur close to the neutral axis of the section and consequently these deep section rings afford great rigidity to the entire structure against distortion.

Additional bolts, 25, 26, for securing the halves of the rods together are conveniently disposed in the shank and adjacent the unused hinge pin station 27, which occurs under the shank.

The hinge pins are conveniently provided with bushings 28, engaging the thru bolts, 24, in order to positively locate the bearing halves against rotation within the rings.

It should be noted that the split bearing 15 is divided on the line 35 (Fig. 2) which is offset in a manner as to form a pilot 36. The division extends through the major portion of the bearing so as to be equally spaced away from adjacent hinge pin bearings, disposed on either side thereof.

One of the objects of reinforcing the bearing member 15 against the loads from the auxiliary rods by means of the deep section embracing rings 13, 14 in the manner shown, is to permit of a relatively light construction for this bearing member and in the drawings there is illustrated a construction suitable for economical production and ease of fabrication as by casting in aluminum alloy. Deep stiff ribs 29, are provided between the flanges of the bearing halves intermediate the auxiliary rods, thus stiffening the bearing against lateral deflection between these flanges. A bearing lining shell 30, also split, is indicated in the drawing, but if desired the entire bearing halves may each be made of material suitable for direct bearing contact with the crankpin since the relatively low strength of such material will be compensated for by the reinforcing effect of the rod rings 13, 14.

One of the principal features of this invention resides in the elimination of the usual separate cap and bolts and the provision of a construction having a rod end comprising continuous reinforcing rings, and these advantages will be realized even in the case where the further feature whereby the upsplit rods may be threaded over the crankshaft cheeks need not be utilized as would be the case for instance with a built-up crankshaft.

It will be noted that not only are the rings 13, 14 of uniform section but that they possess a section proportional to that of the shank to which they are united, and thus avoid the sudden change in general section which has been a source of weakness in construction wherein the hinge pin bosses were forged integrally with the shank and bearing end of the rod.

It will be understood that in assembling the device upon the crankshaft, the split bearing 15 together with its auxiliary rods 17 and the associated bearing lining 30, are first placed around the crankpin of the shaft after which the two halves of the master rod are placed thereabout in the manner hereinbefore stated and the parts secured by the bolts 24, 25 and 26.

It will be appreciated that the parts are of such construction as to permit of being readily fabricated by ordinary methods and that the parts as formed permit of exceptional lightness whilst the assembled structure provides extreme rigidity. It will further be appreciated that the master rod as shown can be used without change in connection with a bearing member fabricated to accommodate any desired number of auxiliary rods.

Having shown and described and having pointed out in the annexed claims certain novel features of my invention, it will be understood that various omissions, substitutions and changes in form and detail of the device illustrated and in its operation may be made by those skilled in the art without departing from the spirit of the invention.

Having thus described my invention, I claim:

1. A connecting rod assemblage including in combination, a crank pin bearing comprising separable portions, hinge pin means on said bearing adapted to support one end of a plurality of auxiliary rods, and a master rod provided with an integral ring portion adapted to embrace said bearing in a manner as to maintain the portions thereof in fixed relation.

2. In a connecting rod for a radial engine having a crankshaft, the combination of a divided crankpin bearing adapted to operatively support one end of a plurality of auxiliary rods, a master rod including an integral ring member adapted to embrace the portions of the bearing so as to maintain the parts in operative relation.

3. In a connecting rod for a crankshaft, the combination of a crankpin bearing member, a plurality of auxiliary rods articulated to the bearing member, and a master rod provided with an integral annular portion adapted to embrace said bearing member.

4. The combination with a plurality of subsidiary rods having hinge pins, of an articulated connecting rod structure comprising, a master rod including an integral shank and ring, and a split bearing having flange means adapted to fit in said ring in a manner as to be held in fixed relation therewith; said flange means being provided with a plurality of apertures each adapted to receive the hinge pin of a subsidiary rod.

5. The combination with a crankshaft having a crankpin and auxiliary rods having hinge pins, of a crankpin bearing comprising two parts adapted in their assembled relation to rotatably engage the crankpin and provided with bores to receive the hinge pins for the articulation of the auxiliary rods thereby, and a master rod comprising integrally formed shank and ring portions; the ring portion being adapted to embrace and to secure into position the bearing parts set forth.

6. In an engine having a multiplicity of radially disposed cylinders provided with connecting rods having hinge pins, the combination of a main rod constituting a connecting rod for one of said cylinders and comprising integral shank and ring portions, a split crankpin bearing having flanges for the reception of the balance of said connecting rods therebetween; said flanges being bored to receive the hinge pins, said crankpin bearing adapted to fit within and to be secured by said ring portions.

7. In a connecting rod for an engine having a crankshaft and a divided crankpin bearing thereon, the combination of a rod formed of two half portions abutting at the midtransverse plane of the bearing each half comprising a shank portion and an integral ring portion; each of said ring portions being adapted to embrace and secure the divisions of the crankpin bearing against separation, and means to secure the two half portions of said rod together in a separable manner.

8. A connecting rod structure comprising in combination, a divided crankpin bearing having flanges, hinge pins supported by said flanges, a master rod divided at the mid-transverse plane of said bearing and comprising integrally formed shank and ring portions, said ring portions being adapted to embrace and secure the divisions of said crankpin bearing whilst abutting the ends of the hinge pin to prevent end motion thereof.

9. A connecting rod structure comprising in combination, a divided crankpin bearing having flanges, hinge pins supported by said flanges, a master rod divided at the mid-transverse plane of said bearing and comprising integrally formed shank and ring portions; said ring portions being adapted to embrace and secure the divisions of said crankpin bearing whilst abutting the ends of the hinge pins to prevent end motion thereof, and means extending through said hinge pins for securing the ring portions thereagainst.

10. The combination with a crankshaft having a crankpin bearing, of a connecting rod comprising two half portions abutting at the longitudinal axis of the rod; each portion comprising in integral relationship a shank, a wrist-pin bearing and a ring portion; said ring portions adapted to embrace the crankpin bearing, and means to secure the two half portions together upon said bearing.

11. The combination with a radial engine having a crankshaft, a master rod and a plurality of subsidiary rods provided with hinge pins, of a split crankpin bearing member adapted to be embraced by the master rod and comprising a cylindrical portion having a radially extended flange, said flange being bored for the reception of the hinge pins.

12. In apparatus of the class described, the combination of a master rod divided on its longitudinal axis each division comprising in integral relationship a shank portion, a wrist pin bearing and an enlarged ring portion, said ring portions being axially spaced apart in their assembled relation, a crankpin bearing member split axially, circular flanges extending radially from the bearing member, rib portions connecting said flanges, hinge pins supported in the flanges; said bearing member being engaged on either side by the ring portions of the master rod, and draw bolts extending through said ring portions and flanges to maintain the parts in their assembled relation.

13. In apparatus of the class described, the combination of, a master rod formed of two half portions connected in a separable manner; each half comprising in integral relationship a shank, a wrist pin bearing, and an enlarged ring portion; said ring portions in their assembled relation being spaced apart, a crankpin bearing member disposed between said ring portions and secured thereby, a plurality of hinge pins supported in said bearing in a manner so that the ends of said hinge pins abut the ring portions.

14. In a connecting rod for an engine or the like having a crankshaft, the combination of, two half portions abutting on their longitudinal axis and connected in a separable manner; each portion comprising in integral relationship a shank, a wrist pin bearing, and an enlarged ring portion; each ring portion being adapted to be passed axially over the crankshaft for assembly of the portions.

Signed at Keyport, in the county of Monmouth, and State of New Jersey this 9th day of January, A. D. 1926.

ROLAND CHILTON.